(12) United States Patent
Clavin et al.

(10) Patent No.: US 9,268,404 B2
(45) Date of Patent: Feb. 23, 2016

(54) APPLICATION GESTURE INTERPRETATION

(75) Inventors: John Clavin, Seattle, WA (US);
Kenneth Alan Lobb, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1223 days.

(21) Appl. No.: 12/684,567

(22) Filed: Jan. 8, 2010

(65) Prior Publication Data

US 2011/0173574 A1    Jul. 14, 2011

(51) Int. Cl.
G06F 3/00 (2006.01)
G06F 3/033 (2013.01)
G06F 3/01 (2006.01)

(52) U.S. Cl.
CPC ....................................... *G06F 3/017* (2013.01)

(58) Field of Classification Search
None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Mouse Gesture Task Switcher (mgSwitch) 2.0—Published Date: Jul. 6, 2009 http://wareseeker.com/System/mouse-gesture-task-switcher-mgswitch-2.0.zip/7d04f41ee.

(Continued)

*Primary Examiner* — Yongjia Pan
(74) *Attorney, Agent, or Firm* — Steve Wight; Judy Yee; Micky Minhas

(57) ABSTRACT

In a gesture-based system, gestures may control aspects of a computing environment or application, where the gestures may be derived from a user's position or movement in a physical space. A gesture-based system may have a plurality of modes, each mode a hardware configuration, a software configuration, or a combination thereof. Techniques for transitioning a user's control, via the user's gestures, between different modes enables a system to coordinate controls between multiple modes. For example, while a first mode is active, the user's gestures may control aspects of the first mode. The system may transition the user's control from a control of the first mode to a control of a second mode. The transition may be between hardware, software, or a combination thereof. In another embodiment, reserved gestures that correspond to a first mode that may be executed whether or not a second mode is present.

20 Claims, 9 Drawing Sheets

(56) References Cited

U.S. PATENT DOCUMENTS

| | | | |
|---|---|---|---|
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,252,951 A * | 10/1993 | Tannenbaum et al. | 345/156 |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,404,458 A * | 4/1995 | Zetts | 710/73 |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,563,988 A | 10/1996 | Maes et al. | |
| 5,570,113 A * | 10/1996 | Zetts | 345/173 |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,732,283 A * | 3/1998 | Rose et al. | 710/16 |
| 5,784,504 A * | 7/1998 | Anderson et al. | 382/309 |
| 5,862,256 A * | 1/1999 | Zetts et al. | 382/187 |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,176,782 B1 * | 1/2001 | Lyons et al. | 463/36 |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,180,501 B2 * | 2/2007 | Marvit et al. | 345/156 |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,331,929 B2 * | 2/2008 | Morita et al. | 600/558 |
| 7,348,963 B2 | 3/2008 | Bell | |
| 7,359,121 B2 | 4/2008 | French et al. | |
| 7,365,737 B2 * | 4/2008 | Marvit et al. | 345/156 |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,536,656 B2 * | 5/2009 | Hullender et al. | 715/863 |
| 7,555,142 B2 | 6/2009 | Hildreth et al. | |
| 7,560,701 B2 | 7/2009 | Oggier et al. | |
| 7,568,035 B2 * | 7/2009 | Gupta et al. | 709/226 |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,606,411 B2 * | 10/2009 | Venetsky et al. | 382/153 |
| 7,607,509 B2 | 10/2009 | Schmiz et al. | |
| 7,620,202 B2 | 11/2009 | Fujimura et al. | |
| 7,623,119 B2 * | 11/2009 | Autio et al. | 345/173 |
| 7,668,340 B2 | 2/2010 | Cohen et al. | |
| 7,680,298 B2 | 3/2010 | Roberts et al. | |

(56) References Cited

U.S. PATENT DOCUMENTS

| | | | |
|---|---|---|---|
| 7,683,954 B2 | 3/2010 | Ichikawa et al. | |
| 7,684,592 B2 | 3/2010 | Paul et al. | |
| 7,692,667 B2* | 4/2010 | Nguyen et al. | 345/619 |
| 7,701,439 B2 | 4/2010 | Hillis et al. | |
| 7,702,130 B2 | 4/2010 | Im et al. | |
| 7,702,282 B2* | 4/2010 | Sandegerd et al. | 455/41.2 |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,840,912 B2* | 11/2010 | Elias et al. | 715/863 |
| 7,843,425 B2* | 11/2010 | Lu et al. | 345/156 |
| 7,852,262 B2 | 12/2010 | Namineni et al. | |
| RE42,256 E | 3/2011 | Edwards | |
| 7,898,522 B2 | 3/2011 | Hildreth et al. | |
| 7,903,084 B2* | 3/2011 | Marvit et al. | 345/156 |
| 8,010,911 B2* | 8/2011 | Sohn et al. | 715/863 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,044,989 B2* | 10/2011 | Mareachen | 348/14.08 |
| 8,072,470 B2 | 12/2011 | Marks | |
| 8,154,428 B2* | 4/2012 | Do et al. | 341/20 |
| 8,181,123 B2* | 5/2012 | Stone-Perez et al. | 715/863 |
| 8,514,251 B2* | 8/2013 | Hildreth et al. | 345/635 |
| 8,893,052 B2* | 11/2014 | Ryu | 715/863 |
| 2004/0066418 A1* | 4/2004 | Tosey | 345/856 |
| 2005/0111735 A1* | 5/2005 | Sheinin | 382/187 |
| 2005/0212752 A1* | 9/2005 | Marvit et al. | 345/156 |
| 2005/0212756 A1* | 9/2005 | Marvit et al. | 345/156 |
| 2006/0136846 A1* | 6/2006 | Im et al. | 715/863 |
| 2006/0288371 A1 | 12/2006 | Jun et al. | |
| 2007/0050724 A1 | 3/2007 | Lee et al. | |
| 2007/0242056 A1* | 10/2007 | Engelhardt et al. | 345/173 |
| 2007/0259716 A1* | 11/2007 | Mattice et al. | 463/36 |
| 2008/0026838 A1 | 1/2008 | Dunstan et al. | |
| 2008/0168379 A1 | 7/2008 | Forstall et al. | |
| 2008/0242415 A1* | 10/2008 | Ahmed | 463/39 |
| 2009/0217211 A1* | 8/2009 | Hildreth et al. | 715/863 |
| 2010/0033422 A1* | 2/2010 | Mucignat et al. | 345/156 |
| 2010/0064261 A1* | 3/2010 | Andrews et al. | 715/863 |
| 2010/0306716 A1* | 12/2010 | Perez | 715/863 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Can a Palm Pre Multitask Better than an iPhone?—Published Date: May 7, 2009 http://www.cnn.com/2009/TECH/ptech/05/07/cnet.palm.pre/index.html.

Multimodal Split View Tabletop Interaction Over Existing Applications—Published Date: Oct. 10, 2007 http://grouplab.cpsc.ucalgary.ca/grouplab/uploads/Publications/Publications/2007-SplitView.Report2007-869-21.pdf.

A Multimodal Framework for the Communication of the Disabled—Published Date: Jul. 16, 2007 http://www.cmpe.boun.edu.tr/enterface07/outputs/final/p3report1.pdf.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

APPLICATION GESTURE INTERPRETATION

BACKGROUND

Many computing applications such as computer games, multimedia applications, office applications or the like use controls to allow users to manipulate characters or control other aspects of an application. Typically such controls are input using, for example, controllers, remotes, keyboards, mice, or the like. Unfortunately, such controls can be difficult to learn, thus creating a barrier between a user and such applications. Furthermore, such controls may be different than actual actions for which the controls are used. For example, a game control that causes a game character to swing a baseball bat may be a combination of buttons and may not correspond to an actual motion of swinging the baseball bat, or a control to reposition a view on a screen, such as repositioning the view of a map in a map application, may be a selection of arrow buttons on a keyboard and may not correspond to the actual motion of the files.

Typically, each computing environment and even computing applications in the same computing environment require unique controllers. For example, a user may interact with a typical television remote control to control aspects of a television and may use a mouse or a keyboard to interact with a personal computer. The many types of controllers and the many varied methods of interacting with each controller may also create a barrier between a user and such systems and/or applications. Not only do the multiple types of controllers require the user to learn multiple methods of inputs for control, but the user may have to learn different controls for different controllers for each computing environment with which the user interacts.

SUMMARY

In a gesture-based system, gestures may control aspects of a computing environment or application, where the gestures may be derived from a user's position or movement in a physical space. For example, a capture device may capture data representative of a user in a physical space. A processor may process the captured data to determine a user's gesture and translate the gesture into a control of an aspect of the gesture-based system. A display device may display a visual representation of the control and/or a visual representation of the user mimicking the user's gestures.

Disclosed herein are techniques for transitioning the user's control, via the user's gestures, between different modes. For example, while an application mode is active (e.g., the user is playing a game or working in a productivity application), the user's gestures may control aspects of the application. In an example embodiment, the system may transition the user's control from a control of the application to a control of a different mode, such as for controlling platform functionality in a platform mode (e.g., launch a different application, mute all applications, pause all applications, etc). In another embodiment, there may be a subset of gestures that corresponds to a first mode that may be executed whether or not a second mode is present. For example, the subset of gestures may correspond to platform functionality, and gestures within that subset may be executed even while the system is in an application mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF ILLUSTRATIVE EMBODIMENTS

Figure 1:
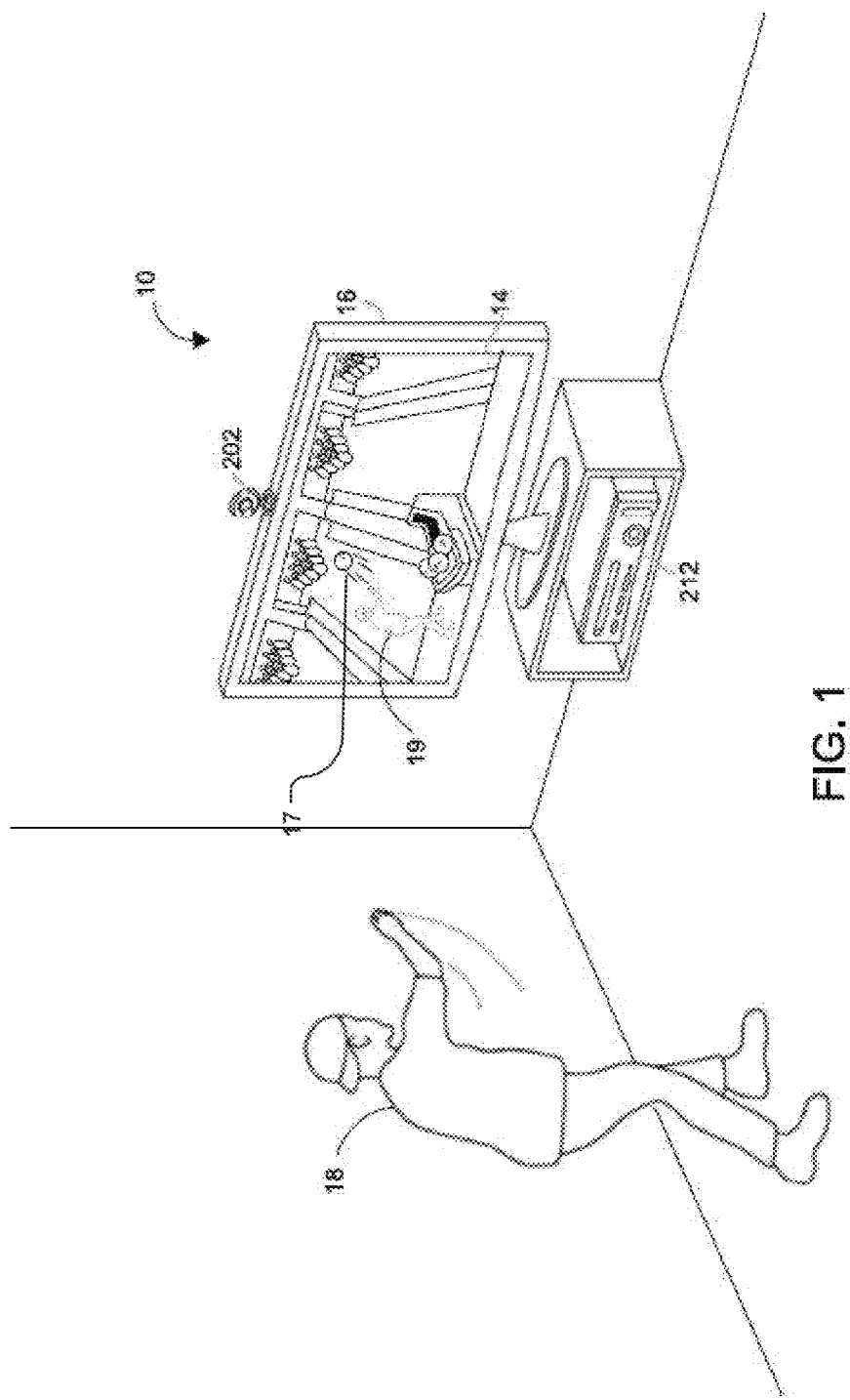
FIG. 1 illustrates an example embodiment of a target recognition, analysis, and tracking system with a user playing a game.

Disclosed herein are techniques for implementing gestures applicable to a mode. For example, a mode may be an application mode or a platform mode, and the system may implement a gesture set. The gesture set may comprise gesture recognition data applicable for the mode for comparison against the user's input gesture data. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

A gesture may be derived from a user's position or motion in the physical space and may include any user motion, dynamic or static, such as running, moving a finger, or a static pose. According to an example embodiment, a capture device, such as a camera, may capture data, such as image data, that is representative of the user's gesture(s). The computer environment may display user feedback by mapping the user's gesture(s) to an avatar on a screen.

A computer environment may be used to recognize and analyze the gestures made by the user in the user's three-dimensional physical space such that the user's gestures may be interpreted to control aspects of a system or application space. A gesture-based system or application may have default gesture information for determining if a user is performing a particular gesture. For example, a system may have a gesture recognizer that compares captured data to a database of default gesture recognition data such as filters with default gesture parameters. The gesture recognizer may compare input gesture data received by the capture device to the default gesture information and output a gesture. The output may include a confidence level that the output gesture was performed. The recognition of a gesture may result in a control of the gesture-based system or the issuance of a command that performs an action in the gesture-based system. For example, a gesture for powering on a game console, that is part of the gesture-based system, may comprise a user placing his hand in front of his body and turning his wrist to simulate the motion of turning a knob. The system may recognize this as a "power on" command and issue the command to the game console.

Embodiments are related to techniques for transitioning the user's control via gestures between modes of the system, wherein a mode may be related to the hardware or software components of the gesture-based system. For example, it may be desirable that a user's gestures in a first instance control the operating system but in a second instance the user's gesture controls the application executing on a computing environment.

The system, methods, techniques, and components of transitioning control via gestures may be embodied in a multimedia console, such as a gaming console, or in any other computing environment in which it is desired to display a visual representation of a target, including, by way of example and without any intended limitation, satellite receivers, set top boxes, arcade games, personal computers (PCs), portable telephones, personal digital assistants (PDAs), and other hand-held devices.

FIG. 1 illustrates an example embodiment of a configuration of a target recognition, analysis, and tracking system 10 that may employ the disclosed techniques. In the example embodiment, a user 18 is playing a bowling game. In an example embodiment, the system 10 may recognize, analyze, and/or track a human target such as the user 18. The system 10 may gather information related to the user's motions, facial expressions, body language, emotions, etc, in the physical space. For example, the system may identify and scan the human target 18. The system 10 may use body posture recognition techniques to identify the body type of the human target 18. The system 10 may identify the body parts of the user 18 and how they move.

As shown in FIG. 1, the target recognition, analysis, and tracking system 10 may include a computing environment 212. The computing environment 212 may be a multimedia console, a personal computer (PC), a gaming system or console, a handheld computing device, a PDA, a mobile phone, a cloud computer, a capture device, or the like. According to an example embodiment, the computing environment 212 may include hardware components and/or software components such that the computing environment 212 may be used to execute applications. An application may be any program that operates or is executed by the computing environment including both gaming and non-gaming applications, such as a word processor, spreadsheet, media player, database application, computer game, video game, chat, forum, community, instant messaging, or the like.

As shown in FIG. 1, the target recognition, analysis, and tracking system 10 may include a capture device 202. The capture device 202 may be, for example, a camera that may be used to visually monitor one or more users, such as the user 18, such that gestures performed by the one or more users may be captured, analyzed, and tracked to perform one or more controls or actions within an application. In the example embodiment shown in FIG. 1, a virtual object is a bowling ball and the user moves in the three-dimensional physical space as if actually handling a bowling ball. The user's gestures in the physical space can control the bowling ball 17 displayed on the screen 14. In example embodiments, the human target such as the user 18 may actually have a physical object. In such embodiments, the user of the gesture-based system may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 212 may include a video adapter such as a graphics card and/or an audio adapter such as a sound card that may provide audiovisual signals associated with the game application, non-game application, or the like. The audiovisual device 16 may receive the audiovisual signals from the computing environment 212 and may then output the game or application visuals and/or audio associated with the audiovisual signals to the user 18. According to one embodiment, the audiovisual device 16 may be connected to the computing environment 212 via, for example, an S-Video cable, a coaxial cable, an HDMI cable, a DVI cable, a VGA cable, or the like.

As used herein, a computing environment may refer to a single computing device or to a computing system. The computing environment may include non-computing components. As used herein, a computing system, computing device, computing environment, computer, processor, or other computing component may be used interchangeably. For example, the computing environment may comprise the entire target recognition, analysis, and tracking system 10 shown in FIG. 1. The computing environment may include the audiovisual device 16 and/or the capture device 202. Either or both of the exemplary audiovisual device 16 or capture device 202 may be an entity separate but coupled to the computing environment or may be part of the computing device that processes and displays, for example. Thus, a computing environment may be a standalone capture device comprising a processor that can process the captured data. Thus, capture device 202 may be equipped to not only process the captured data, but analyze and store data, output the data to a screen, etc.

As shown in FIG. 1, the target recognition, analysis, and tracking system 10 may be used to recognize, analyze, and/or track a human target such as the user 18. For example, the user 18 may be tracked using the capture device 202 such that the gestures of user 18 may be interpreted as controls that may be used to affect the application being executed by computer environment 212. Thus, according to one embodiment, the user 18 may move his or her body to control the application. The system 10 may track the user's body and the motions made by the user's body, including gestures that control aspects of the system, such as the application, operating system, or the like.

The system 10 may translate an input to a capture device 202 into an animation, the input being representative of a user's motion, such that the animation is driven by that input. Thus, the user's motions may map to a visual representation, such as an avatar, such that the user's motions in the physical space are emulated by the avatar. The rate that frames of image data are captured and displayed may determine the level of continuity of the displayed motion of the visual representation.

FIG. 1 depicts an example embodiment of an application executing on the computing environment 212 that may be a bowling game that the user 18 may be playing. In this example, the computing environment 212 may use the audiovisual device 16 to provide a visual representation of a bowling alley and bowling lanes to the user 18. The computing environment 212 may also use the audiovisual device 16 to provide a visual representation of a player avatar 19 that the user 18 may control with his or her movements. The computer environment 212 and the capture device 202 of the target recognition, analysis, and tracking system 10 may be used to recognize and analyze the gestures made by the user 18 in the user's three-dimensional physical space such that the user's gestures may be interpreted to control the player avatar 19 in game space. For example, as shown in FIG. 1, the user 18 may make a bowling motion in a physical space to cause the player avatar 19 to make a bowling motion in the game space. Other movements by the user 18 may also be interpreted as controls or actions, such as controls to walk, select a ball, position the avatar on the bowling lane, swing the ball, etc.

Multiple users can interact with each other from remote locations. The computing environment 212 may use the audiovisual device 16 to provide the visual representation of a player avatar that another user may control with his or her movements. For example, the visual representation of another bowler on the audiovisual device 16 may be representative of another user, such as a second user in the physical space with the user, or a networked user in a second physical space.

Gestures may be used in a video-game-specific context such as the bowling game example shown in FIG. 1. In another game example such as a driving game, various motions of the hands and feet may correspond to steering a vehicle in a direction, shifting gears, accelerating, and breaking. The player's gestures may be interpreted as controls that correspond to actions other than controlling the avatar 19, such as gestures used for input in a general computing context. For instance, various motions of the user's 18 hands or other body parts may be to end, pause, or save a game, select a level, view high scores, communicate with a friend, etc.

While FIG. 1 depicts the user in a video-game-specific context, it is contemplated that the target recognition, analysis, and tracking system 10 may interpret target movements for controlling aspects of an operating system and/or application that are outside the realm of games. Virtually any controllable aspect of an operating system and/or application may be controlled by movements of the target such as the user 18. For example, the user's gestures may correspond to common system wide tasks such as navigate up or down in a hierarchical list, open a file, close a file, and save a file. The user's gesture may be controls applicable to an operating system, non-gaming aspects of a game, or a non-gaming application. For example, the user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

Figure 2A:
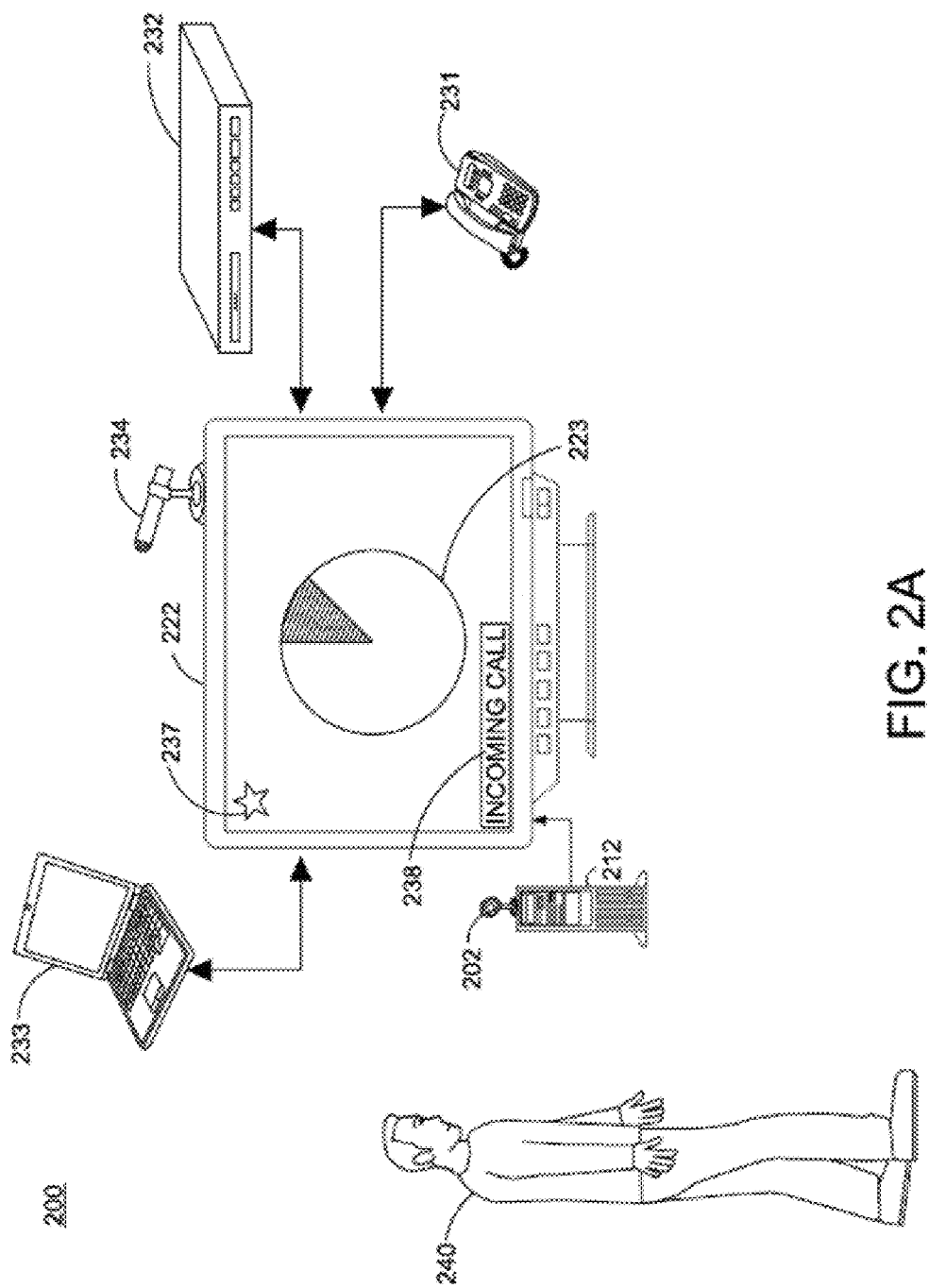
FIG. 2A illustrates an example embodiment of a computing environment in which gesture sets may apply for a plurality of modes

FIG. 2A depicts a gesture-based system 200 that incorporates a capture device 202, a microphone 234, a computing environment 212, telephone capabilities via a telephone 231, movie playback capabilities via a movie player 232, personal computing capabilities via a personal computer 233, and a display 222. The computing environment 212 may perform any of the functionality of the devices 231, 232, 233, 202, 234, but for purposes of explanation, the capabilities are represented by separate components. The system 200 may recognize gestures from the captured data that correspond to controls of any aspect of the system 200.

The system 200 may comprise any number of computing environments, capture devices, displays, or any combination thereof. It is understood that any number of these components may share capabilities or capabilities may change over time. For example, the personal computer 233 may have movie playback capabilities. The example devices referenced in relation to certain functionalities are exemplary only, as it is contemplating that devices and their capabilities may change, such as due to changes in technology. For example, a movie playback device may read a removable media for playing a movie, but if the movie playback has downloading capabilities and network access to a provider of downloadable movies, the movie player 232 may download content over the network. The movie playback device itself may not be necessary at all; for example, the computing environment 212 may have capabilities to download and play movie content from the network.

The exemplary devices shown in FIG. 2 are not exhaustive. The capture device, computing device, and display device may comprise any suitable device that performs the desired functionality, such as the devices described with respect to FIG. 1 above or FIGS. 3-9 described below. A computing environment may be a multimedia console, a personal computer (PC), a gaming system or console, a handheld computing device, a PDA, a mobile phone, a cloud computer, include a phone, such as a cell phone, a desk phone, a smart phone, a Session Initiation Protocol (SIP) phone, a video phone, or the like, a game console, a netbook, laptop, desktop, interactive wall display, a portable or non-portable media player, e.g., a portable music player, such as an MP3 player, a walkmans, etc., an email device, a thin client, a portable gaming device, etc., consumer electronic devices, such as TVs, DVD players, set top boxes, monitors, displays, etc., a public computing device, such as a kiosk, an in-store music sampling device, an automated teller machine (ATM), a cash register, etc., a navigation device whether portable or installed in-vehicle and/or a non-conventional computing device, such as a kitchen appliance, a motor vehicle control (e.g., steering wheel), or the like, as well as combinations of these devices.

The computing environment may incorporate, include, or otherwise connect to a capture device or display. The concepts disclosed herein are contemplated for use with any number of devices. The devices may be in communication with each other such that each device in the system does not require the capability to process gesture data. For example, the computing environment 212 may process the gesture data, recognize a control that corresponds to a particular device, and issue the command to the particular device to execute the control.

For exemplary purposes, a snapshot of an example application for presenting information, shown in FIG. 2A, is represented by a graph 223 displayed on the screen. The techniques disclosed herein enable a user 240 to transition control between modes. A mode is a feature of the system and may be an indicator that a particular set of gestures is applicable. The mode may be associated with a state of control that corresponds to the applicable set of gestures. Examples of modes may include an application mode, an operating system or platform mode, a gaming mode, a communications mode, an office mode, a movie mode, a device mode, or the like.

A common set or subset of input gestures would enable users to interact with the components through different experiences with at least some of the same gestures. Thus, a user does not have to learn the inputs for several unique input devices but, rather, can use gestures within the common set of gestures for control. Gestures may be specific to a mode, such that if the user performs a particular gesture, the system recognizes to which mode the gesture should apply. For example, if the user is interacting with a word processing document and the telephone rings, the user may gesture in a manner that is specific to a desired interaction with the telephone, such as an "answer call" gesture or a "mute call" gesture. The same gestures may be applicable in more than one mode, or gestures may be similar between modes making it more difficult to discern the mode associated with the gesture. The disclosed techniques enable the user to interact with different modes by recognizing the mode to which a gesture is applicable or recognizing the desired transition between modes.

The modes may comprise gestures applicable to the mode, such that different gesture sets differentiate between the modes. Transitioning between modes may comprise transitioning the comparison of input gesture data to gesture recognition data applicable to a first set of gestures in a first mode to gesture recognition data applicable to a second set of gestures in a second mode. Modes may define various states of control of the system, where a state of control may be associated with a hardware configuration, a software configuration, or a combination thereof. For example, a mode may be associated with gestures that control an environment, such as controlling aspects of a main processor (e.g., power on, power off).

In an example, the transition between the first and second mode may transition control between two applications, such as between the control of a first application and the control of a second application. In another example, a first mode may be a device mode and a second mode may be an application mode. In this example, gestures applicable in the first mode may translate to controls of a particular device, and gestures applicable in the second mode may translate to controls of the application. A mode may comprise either or both hardware and software functionality. For example, a platform may include a computer's architecture, operating system, programming languages, runtime libraries, and a graphical user interface. In a platform mode, therefore, gestures may translate to a control of many aspects of the computing environment. The system may transition the user's control from a first mode to a second mode, such as transitioning the control associate with a user's gesture from a control of the application to a control of a different mode, such as for controlling platform functionality in a platform mode (e.g., launch a different application, mute all applications, pause all applications, etc).

The transition of modes may be a transition between hardware components, such as a transition of the control of a user's gestures to a first device to a second device. For example, a communications device mode may be active, where a user's gestures control aspects of the communications device (e.g., turn on, turn off, mute). The user may wish to transition to control of a movie playing device, and the system may transition the user's control between the devices, where each device is classified as a mode.

A transition between modes may be a transition between active modes, from an active mode to a non-active mode, or between non-active modes. A mode may be active when the user's gestures control an aspect of that mode or capable of controlling an aspect of that mode (e.g., if the system is using gesture recognition data for a particular mode, that mode may be considered an active mode). For example, an application mode may be active (e.g., the user is playing a game or working in a productivity application) such that the user's gestures are translated into controls of the application. Thus, the user's gestures may be compared to gesture recognition data associated with the application mode and translated into the appropriate application controls.

More than one mode may be active at any given time. For example, a computing environment may be active if it is powered on, a platform or operating system that is functioning on the computing environment may also be active, and an application executing on the computing environment may be active. More than one application may be considered active if the user is able to gesture and have the gesture control an aspect of either application. A first and second application may both be loaded and executing, even if the user is actively interacting with the first application and not the second application, for example. A second mode may be inactive and become active upon the occurrence of a triggering event, such as if the system recognizes a gesture applicable to a control in the second mode. Additional examples of triggering events are described below. When a user's gestures may be applicable to more than one mode, the techniques disclosed herein provide a manner in which the system appropriately identifies the mode to which apply a control, and/or a manner in which the user may transition control between modes.

Consider an example of the system having two modes, a platform mode and an application mode, wherein the application is executing on the platform. Platform mode is active when the system translates gestures for control of the platform and not the application, whereas application mode is active when the system focus is on the particular application (or a plurality of applications).

In an embodiment, platform functionality is functionality implemented by the platform software (platform software manages the hardware) whereas application functionality is functionality implemented by an application installed on and managed by the platform software. In the instance of a desktop computer graphical user interface, for example, these types of functionality may be segmented visually: mouse input provided to the desktop, the taskbar, and the window frames is managed by the operating system (platform control) whereas mouse input provided within a particular window is generally controlled by a particular application (application control). In the instance of a gaming system, platform functionality may be implemented when the system is in platform mode (e.g., while on the platform dashboard) whereas application functionality may be implemented when the system is in application mode (e.g., while playing a game).

In a camera-based natural user interface, a user is not required to interact with device (mouse, keyboard, pen) to control a system, but may control the system by performing gestures (a gesture can be a predetermined body motion and may include voice commands). In many application mode situations, such as while playing a game or watching a movie, it may not be desirable to provide the user with any platform graphical user interface elements (e.g., elements corresponding to platform functionality) because these elements may be distracting. Accordingly, it may not be possible or intuitive for the user to accomplish platform functionality while operating in application mode. This problem may be amplified when a user needs to accomplish a platform function quickly while the system is in application control.

In order to enable users to intuitively switch between system and application control while enabling the user to perform certain system level functions while in application mode, the system may provide gesture sets applicable in different modes. For example, consider three modes, a platform mode, an application mode, and an in-application mode, each associated with a gesture set comprising, respectively, platform gestures (OS level interaction-starting a new application, muting all applications), application gestures (includes in-game interaction), and in-application platform gestures (platform functionality that can be invoked while in application mode). In-application gestures are a type of in-alternate mode gestures, where functionality from a second mode may be invoked while the system is in a first mode such that the gestures in the second mode are functional in a first mode, i.e., in-alternate mode.

In-alternate mode gesture, such as in-application platform gesture, is a type of reserved gesture. Reserved gestures are gestures that are recognized for a control of a particular aspect of the system that will be invoked despite the system mode. For example, regardless of the system mode or modes, a volume change gesture may be applicable for a control of the sound components in the system regardless of the current system mode. Thus, reserved gestures may comprise gestures that are recognized system wide, issuing a command to the system regardless of the mode. Incorporating reserved gestures enables the system to implement multi-mode applicable gestures at one time. Thus, reserved gestures may be available to control an aspect of the system or an aspect of another mode without breaking out of the existing mode.

Reserved gestures may comprise gestures that corresponds to a first mode that may be executed whether or not a second mode is present. An in-alternate mode type of reserved gesture comprises gestures that are reserved within an alternate mode, not necessarily system-wide (but that option is also available). For example, considering in-application platform gestures—platform gestures that may invoke control while the system is in application mode—even if an application associates an application function with a gesture, the system will not provide the gesture input to the application or cause the associated control of the application. Rather, the platform control will be invoked for the gesture. Thus, a reserved subset of gestures may correspond to platform functionality, and gestures within that subset may be recognized even while the system is in an application mode. For example, in this example, the system may have two levels of software, each representing a mode - software that manages functionality at the application level, and software that manages functionality at the platform level. The two modes may have gestures specific to a respective mode, such that the system can differentiate between the intended control based on the gesture alone. It may be desired that some controls are reserved, such as controls for turning on/off the system or pausing the system or an application executing on the system. In the example where the reserved gestures are applicable to the platform, then it does not matter what application is executing as these gestures may still be recognized by the platform.

In another example, an in-application platform gesture that comprises a gesture applicable to both the platform and application may cause both the platform and the application to receive and respond to the gesture input.

The subset of gestures may be a reserved set of gestures that are applicable in a gesture-based system such that developers are able to avoid incorporating gestures that will overlap with the reserved set of gestures. For example, reserved gestures that control aspects of the platform can be avoided for development of gestures that control an application to avoid confusion. If there are similar gestures to those in the reserved gesture set, such as gestures reserved to the platform but also applicable to an application, the gestures may be interpreted with respect to a priority scheme. For example, in this example, the platform may have priority such that the gestures are interpreted with respect to the platform control first, then to a second mode, etc. These settings may be set by the system, by a user, packaged with an application, or any other manner for managing the priority of the gestures to cooperate between the possible modes.

Reserved gestures may be active or non-active such that the user or the system may control whether reserved gestures will be invoked and under what circumstances. For example, a user may set preferences that designate the reserved gestures that should be available despite the system mode and for which mode the reserved gestures apply. For example, a shut down gesture may be a reserved gesture, functioning system-wide to shut down the computing environment 212 and/or any components attached to it, such as the movie player 232. Similarly, a shut down gesture may be defined as an in-alternate mode gesture that functions to shut down just the executing application, but not other components in the system.

It may be desirable to switch between modes or specify a specific mode to which a gesture applies. For example, if a gesture for "shut down" is the same for the platform and for an application, the system may compare the user's input gesture data to gesture recognition data associated with both modes and not know whether to shut down the system or shut down the application. Consider another example where a gesture comprises a motion of the user's hand held flat from a high position which is then lowered to a lower position, where the gesture corresponds to changing a volume in the platform space, but it corresponds to a sitting down or crouching gesture in a game application. Because a system may have any number of functions (e.g., music player, television, telephone, etc), it is desired to bracket controls for an individual mode, and also enable controls that are system-wide and applicable at any time.

Gestures may incorporate audio commands or audio commands may supplement the user's gestures. For example, the user may gesture to add a bullet to a document and then speak words that are then added to the document, following the bullet point. The system may recognize the combination of the gesture to add a bullet and the audio as a control to add the bullet and then write the spoken words to follow the bullet. Because the user may gesture to control the presentation, there is much flexibility for the user to move about the room.

The user is not limited to the use of a controller or having to push buttons directly on the computing environment. It is, however, contemplated that the use of gestures may be combined with the use of controllers/buttons to accommodate both types of control. Some gestures may use information input via a controller in addition to the user's gesture comprised of body motion, for example.

The system may transition the user's control between different devices. For example, a gesture-based system may comprise any number or combination of capture devices, display devices, processors, input devices, etc. In an example combination of components, the gesture-based system may execute gaming software (a first mode), connect to a telecommunications network for telecommunications access (a second mode), and have a local connection to a television (a third mode). The user may transition control between each of the three modes. For example, the user may be playing a game, but wish to answer an incoming phone call. The techniques disclosed herein enable the user to transition between modes for control or enable the user to access to a particular mode that is understood by the system.

Transferring control between modes may be accomplished in any number of ways. For example, the system may recognize a triggering event that indicates a desire to transition modes. A trigger may be, for example, a specific gesture for transitioning the mode, the system's recognition of a gesture that is applicable to a mode that is different from the current mode, a prompt to the user that, if acted upon, indicates a desire to transition between modes.

A specific gesture may be indicative of a desire to transfer control. For example, a user may be playing a game executing on the system. While in game/application mode, the system may recognize a user's transition gesture that comprises, for example, a user putting up a hand with the palm facing the screen. The system may recognize the gesture as a pause of the current system mode. The user may return to the current mode via another gesture or the system may remain paused, where a subsequent gesture may indicate a mode to which to transition. The system may break out of a first mode and transition to the second mode.

The triggering event may prompt user's selection of a different mode. For example, a user's pause gesture may trigger the system to provide options for transitioning to a new mode. An externally-initiated trigger, such as the system receiving a phone call or detecting the receipt of an electronic mail message, may prompt the user's selection of a different mode. Modes for selection may be selectable from a list, such as a list of modes displayed on a screen as a result of a recognition of a desire to transition between modes. In another example, modes may be identified by a number, such as the user holding up a number of fingers that corresponds to a number associated with a mode. The number that is associated with a mode may be identified as a mode is instantiated (ex. If an application is executed, upon execution the system may assign a number). The components attached to the system may be given a number upon recognition of the hardware, for example. In another example, the system may transition to a new mode automatically without user intervention. For example, when the system receives a phone call, the system may revert to the telephone mode without a user's explicit request to transition modes but rather transitioned intelligently by the system upon receipt of the call or when the user pauses the system. The user may set preferences regarding when and how the system should transition between modes and the system may have default settings for transition that are packaged with the system.

Temporary control may be implemented for a particular mode, where more than one mode may be in effect, but temporary control specific to a mode may be recognized. For example, from a perspective of programmability, consider a scenario in which a user wants to answer a call but continue playing a game as a default. Temporary control for a mode, such as the telephone mode, may be implemented even while the system is in game application mode. Similar to the reserved gesture concept, where reserved gestures are applicable despite the current mode, temporary gestures may be applicable for a temporary period. For example, during the temporary implementation of gestures for a mode, the temporary mode may be placed appropriately in a priority scheme to dictate the temporary override of another mode. The temporary mode may be placed first in priority such that the temporary mode gestures are applicable despite any other current mode. However, the temporary mode could be placed elsewhere in the priority scheme, such as below a platform mode but ahead of an application mode. Thus, based on this example priority scheme, a gesture in the temporary mode that may be applicable to an application mode will result in a control of the temporary mode, but a gesture in the temporary mode that may also be applicable to the platform will result in the control of the platform.

In the example depicted in FIG. 2A, consider an example scenario. A user is playing a game, a phone rings, and the user wants to mute the entire system (e.g.,-not just mute the game, because he could be listening to music independent of the application being played). A reserved gesture applicable to the platform or applicable system-wide may accomplish a mute of the volume for components in the system. At the completion of the call, the system may be unmuted via a reserved gesture and the game play may resume. Flexibility in programmability of which gestures are reserved enables a system's scheme for gesture recognition to be tailored for a particular configuration or a user. For example, consider that a first user may wish to answer a call while continuing game play as a default, while a second user may want the option to vary preferences for answering a call depending on the identity of the caller (e.g., a friend vs. an employer).

In another example, a user is watching a movie, and he wants to quickly check his calendar. The user desires to pause the movie and view the user's calendar. The user may perform gesture applicable to the first mode, the movie play mode, to pause the movie. Alternately, a system-wide pause gesture may pause the movie components, including other components involved for movie play, such as a speaker system. The user may then gesture to control the second mode that provides the calendar functionality. As described above, a triggering event may trigger the system's transition to a new mode. For example, the gestures in the first mode may be independent of the gestures in the second mode such that the system recognizes the transition of control based on gesture recognition of the input gesture data as compared to gesture recognition data applicable to each mode. The user may interact with the calendar, gesturing to view yesterday and next week, then resumes the movie with a resume gesture.

In another example, certain gestures, actions, or requests may trigger a subsequent action. Consider a user that is watching a movie and an incoming call is received by the system. The user may answer the call with a gesture, which may cause the movie to pause and everything but the call be muted. Thus, the system may recognize an incoming communication request and take action within the system to respond to the incoming communication request. For an incoming call, a user may need to communicate orally, and upon recognition of the user's desire to answer the call (via the user's gesture) the system may pause the current mode and mute any other audio components in the system. At the completion of the call, control may return to the movie application without needing another gesture. In another instance, the system receives a call, but instead of answering, the user gestures a "do not disturb" gesture which updates the user's status across all communication applications. At the end of the movie, the system may ask the user whether the user would like to revert to available status, which he can accept with a gesture. The system may provide a queue of the incoming requests for communication with the user that occurred during the period communication was put on hold due to the user's "do not disturb" gesture.

In an example, the gesture-based system may indicate a pending mode transition upon a triggering event. For example, a pending mode transition may be indicated by an on-screen indication. For example, symbol 237 is a notification that may appear on the screen, in this example in the upper left hand corner. The symbol may be indicative of a particular request received by the system, such as a request related to an incoming phone call or the receipt of an email. The user may select the symbol 237 via a gesture, such as by pointing at the symbol 237 or making a clutching motion when a cursor corresponding to the user's point is on top of the symbol 237. In another example, the mode may be indicated by a message, such as message 238. The user 240 may select to view the message via a gesture.

The system may be packaged with default parameters with regards to process the transition between modes, such as if the request to transition modes is a symbol on the screen, such as symbol 237, or if the user explicitly gestures to make the transfer, for example. The user may change parameters and tailor the system's response to mode transitions. For example, the user may select that incoming emails from a user's family member may be flashed via text at the bottom of the screen, such as message 238. However, if the incoming message is from someone that the user has not put on a preferred list, the notification may be the symbol 237 in the corner of the screen, or no indication at all that interrupts the user's current interaction with the system. For example, a user may play a game via a network with a remote user. The user may place the remote user on a preferred list such that when the remote user is available for game play, the user is notified via a message 238. However, if a remote user unknown to the user attempts to contact the user to interface via the game, the user has the ability to continue game play without interruption by the unknown user.

In another example, the user may set preferences with regards to how the transition occurs, such as if it via a specific gesture, a pause of the game and then the flash of a number with the user's fingers, etc.

Other features of the system may be applicable for the transition. In-alternate mode gestures may be customizable. For example, consider the in-application platform gestures. The system may enable the user to designate what platform functionality is available while in application mode. The system may provide recordable/programmable functionality, such as the ability of the user to record macros (or otherwise program) a complex gesture. Preferences may be set for directing a gesture to a particular device/coordinating devices. For example, consider a scenario where a user is watching a movie on a television component while working on a laptop that process input gesture data, and an incoming call is received by the system. The user may perform a mute gesture, and all devices may mute. If the user performs the answer call gesture, this gesture could be understood by the laptop to mean that the call should be answered by the television and the laptop may direct the television to mute and pause the movie upon answering the call. Thus, there may be a form of coordination between modes.

More than one mode may be capable of processing the gesture or performing the control. For example, a laptop, a telephone, and a television may all provide the ability to process an incoming call and enable communication to the user with respect to the call. A gesture for answering the call, therefore, may be recognized as a control for multiple devices. The devices may coordinate, however, such that one device answers the call and the other devices take appropriate action during a call. Again, these preferences may be determined during development and/or a user may set preferences as desired. There could be one way direction: laptop detects that the person invokes the "answer call" gesture, and instructs the TV to mute.

It is noted that multiple modes may be present at any time. There may be an active mode and passive modes. For example, the active mode may be the mode with which the user is currently interacting with via gestures, such as playing a game executing on the system. The user may wish to have easy access to alternate modes, such as an electronic mail provider mode, a telephone mode, and a media center mode. The alternate modes may be identified via a specific gesture that indicates a desire to transition to the specific mode associated with the gesture, or the system may display an icon on the screen that is selectable via a gesture for transitioning to the alternate mode, or the like. The user may define mode preferences, such as modes to be displayed as icons on the screen, or associated with a number that the user can indicate by holding up the relevant number of fingers.

Figure 2B:
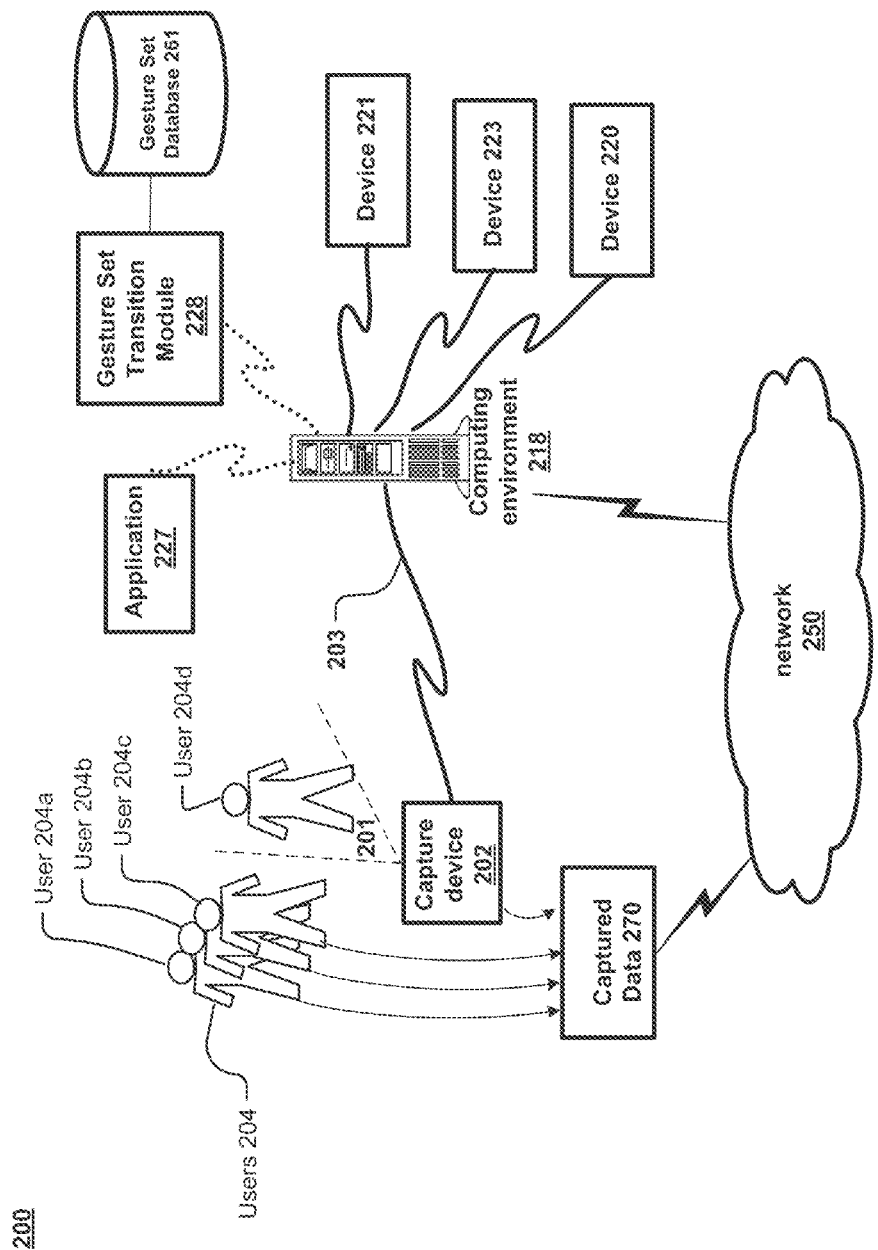
FIG. 2B is a diagram for implementing gesture sets for different modes in a gesture-based system with network capabilities.

FIG. 2B illustrates an example system 200 that may transition control of various components in a system, including gestures processed and received via a network and translated to a control of modes locally or via the network.

The users in this example are users 204*a*, 204*b*, 204*c*, and 204*d*, collectively users 204, but it is contemplated that any number of users may interact with the gesture-based system 200. For exemplary purposes, users 204*a*, 204*b*, and 204*c* in this example are remote to the computing environment 218, user 204*d* is local to computing environment 218. One or more capture devices may be respectively associated with each of the users 204 and capture data that is representative of each user in the user's respective physical space, with capture device 202 representing an example of such capture device. The capture device may be a depth camera or a plurality of cameras, for example, that communicates with a single computing environment or with a plurality of computing environments. The captured data 270 represents captured data captured separately for each of the users 204 or an aggregation of captured data captured for any combination of users.

In this example, the computing environment 218 receives and processes captured data 270, either remotely or locally, that represents each of users 204*a*, 204*b*, 204*c*, and 204*d* for gesture recognition. For example, capture device 202 may provide the captured data 270 to the computing environment 218 via a network 250 or, if the capture device 202 shares a local environment with computing environment 218, via either the network 250 and/or a direct, non-networked connection 203. The captured data 270 associated with remote users 204*a*, 204*b*, and 204*c* may be captured by a remote capture device and provided to the computing environment 218 via the network 250. Devices 220, 221, and 223 represent any component, including hardware, software, or any combination thereof, that may be part of the gesture-based system. For example, the devices may be another application executing on the computing environment 218, a telephone, a movie playback device, or any other computing environment described herein.

System 200 may include a computing environment 218. The computing environment 218 may be a client device, such as a personal computer or game system that a user can use in a local environment. The computing environment 218 may access a network for integrating the user with a server or remote users. As described above, a computing environment may be a multimedia console, a personal computer (PC), a gaming system or console, a handheld computing device, a PDA, a mobile phone, a cloud computer, or the like. For example, the computing environment 218 may be a dedicated video game console, a central server or platform that hosts a plurality of clients, or a personal computing device, such as a cellular telephone or a personal computer. The computing environment 218 may comprise or otherwise be coupled to a capture device for receiving and processing data representative of a user and a user's gestures in a physical space. For example, capture device 202, associated with user 204d, may capture data 270 representative of user 204d in the user's 204d physical space 201. The capture device itself or another computing environment, such as computing environment 218, that receives the captured data may employ gesture recognition techniques to identify gestures from the captured data 270.

Devices 220, 221, and 223 are exemplary devices that are incorporated into the gesture-based system via a connection to the computing environment 218. For example, device 221 may be a telephone such as telephone 231 shown in FIG. 2A. Each of the devices may be connected to or otherwise coupled to the computing environment 218, such as via a wired connection, a local network or wireless connection, or a remote network or wireless connection.

As described, the capture device, such as capture device 202, and computing environment 218 may communicate with other system components via a network 250. A network 250 may include wired or wireless networks. For example, an intranet, an internet, the Internet, a personal area network (PAN), a campus area network (CAN), a local area network (LAN), a wide area network (WAN), a computer network, a gaming network, or the like. The network 250 may also represent the technology that connects individual devices in the network, such as optical fibre, a public switched telephone network (PSTN), a cellular telephone network, a global Telex network, wireless LAN, Ethernet, power line communications, or the like. Components may be connected together by wired or wireless systems, by local networks or widely distributed networks. Any appropriate wireless interface can be utilized for network communications. For example, the wireless link can be in accordance with the following protocols: GSM, CDMA, UMTS, LTE, WIMAX, WIFI, ZIGBEE, or a combination thereof. Any appropriate wired interface can be utilized for network communications. For example, a wired link may be in accordance with the following protocols: TCP/IP, IPX, NetBios, or the like or any combination thereof. A network may include cloud or cloud computing. A cloud infrastructure, for example, may include a multitude of services delivered through data centers and built on servers. The services may be accessible anywhere that provides access to the networking infrastructure. The cloud may appear to be a single point of access to the user and the infrastructure may not be visible to a client. It is contemplated that any similar or suitable wireless or wired protocols may be used, and any similar or suitable network may be used with the disclosed techniques.

In this example, computing environment 218 is shown executing application 227. An application 227 may be any program that operates or is executed by the computing environment including both gaming and non-gaming applications, such as a word processor, spreadsheet, media player, database application, computer game, video game, chat, forum, community, instant messaging, or the like.

The computing environment may store or otherwise have access to input gesture database 260. The input gesture database 260 may contain an inventory of gesture data, such as a structured collection of records and/or data associated with the gesture data captured or received by the computing environment 218, such as captured data 270 that can be received over the network 250.

The computing environment may comprise modules for processing gesture data. For example, the computing environment 218 may comprise gesture set transition module 228.

The gesture set transition module 228 may transition control between modes. The transition module 228 may define the parameters for a transition, such as a specific gesture that causes a transition, or a reserved gesture that transitions control of a mode while one or more modes are active. As described above, the transition of control between modes may be accomplished in many ways. For example, the transition may be implemented if the user performs a "transition modes" gesture. The 'transition modes' gesture may be defined by the user or by the system. In another example, the transition may occur passively to the user based on intelligence by the system. For example, if the user is playing a game and is in the middle of game play, the system may not provide notification of an incoming phone call from a person not in a user's contact list, but rather hold the notification in queue. However, if there is a break in the game, such as between sessions or at the conclusion of a round, the system may send the notification from the queue to the display to solicit a user response. A plurality of notifications may be buffered in the queue, and they may be prioritized based on a priority scheme. For example, if the user receives three incoming calls, one from the user's mom (as identified by comparing the incoming call details to the user's contact list) and two from an unknown user, the system may prioritize the notification associated with the call from the user's mom. In another example, the system may provide the notifications in a menu or displayed list, displaying multiple notifications and a brief summary of the notification.

The gesture set transition module 228 is a unit representative of hardware, software, or a combination thereof that may reside on the computing environment 218 or another part of the gesture-based system and perform the embodiments described herein. The gesture set transition module 228 is described in this specification as module in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

As described above, the gesture set transition module 228 may be located on an end user computing environment or a host environment. Thus, the evolution of the gesture sets or data that modifies a universally provided gesture set may be performed or stored locally or remotely from the computing environment associated locally with the user. If performed locally, a local gesture set transition module 228 may recognize a mode transition for the users that interact directly with the local computing environment 218.

The gesture recognition data applicable to each mode may correspond to various controls, such as select file, open file, close file, power off, load an application, etc. For each gesture, the system may start with a generic description of the gesture properties. As described in more detail below with respect to the gesture recognition architecture, gesture information can include any identifiable parameter(s) of the user's gesture, including ranges, speeds, accelerations, velocities, etc. For example, a gesture may be represented by a trajectory of points of the user's body. As the user moves, a trajectory representing a sequence of points of the user's body may be tracked between captured images. If the trajectory resembles the trajectory defined for the gesture, or falls within an acceptable range for the trajectory defined for the gesture, the system may return an identity of that gesture. For example, a baseball throwing gesture or a portion thereof may have as a parameter a volume of space in which it must occur. This volume of space may typically be expressed in relation to the body where a gesture comprises body movement. For instance, a baseball throwing gesture for a right-handed user may be recognized only in the volume of space no lower than the right shoulder, and on the same side of the head as the throwing arm.

The gesture recognition data applicable for each mode may be locally or remotely stored on a media, e.g., a removable or non-removable media, on a computing environment, e.g., computing environment 218. The media can be removable storage and/or non-removable storage including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information. The storage media may be implemented in any method or technology for storage of information such as computer readable instructions, data structures, program modules, or other data.

The computing environments on the same network can share files and access files and settings local to another computing environment, such as the captured gesture data. The gesture data on a local machine may be accessed from a remote computing environment in various manners. For example, gesture data may be streamed over a network, such as the Internet. A web browser may be viewable on the local computing environment 218, and the user may browse the Internet via the input/output component. The user may select or "click on" a gesture file that is accessible from a server 218 to download or stream to the user's local machine, such as computing device 218. The gesture data may be stored by the local computing environment as a copy or back-up version of the gesture profile that is accessible via the network. In some instances, a temporary gesture set may be cached or otherwise stored temporarily on a local machine. The information in the temporary gesture set may be used to refresh or add to a gesture set stored elsewhere, such as by uploading the gesture data to a central gesture set database 261 via the network 250.

It is noted that gestures may include dynamic or static movement as well as voice commands, and may be performed to control aspects of the system or an executing application. A gesture may also comprise input derived from the combination of user position or movement captured by a capture device (herein "user position data" or "position data") in conjunction with input derived from another source, such as the press of a button on a controller, or the position of an object in a scene in which the user is captured (herein "additional data"). The system may receive controller input from a wired or wireless controller. The user may supplement the motions or poses that he makes with his body that are captured by capture device 202 with input via the buttons, joysticks or other pads of controller. For instance, while playing a first-person shooter game, user 204 may point with his arm at a location displayed by the computing environment 218. He may further press a button on controller at substantially the same time. Computing device 218 may recognize the user pointing while pressing a button as a "discharge firearm" gesture.

Thus, a computing environment may not only include a gesture interface but may process instructions configured to use tactile based (input relying on touch) user input. For example, application 227 may comprise such instructions, where application 227 may be any type of program such as operating system, word processor, videogame, etc. In an embodiment where application 227 is an operating system, the operating system can include input output drivers such as mouse drivers, keyboard drivers, a capture device driver, and other I/O drivers such as, for example, touch screen drivers, microphone drivers, videogame controller drivers, or any other human interface device drivers. In an embodiment where application 227 is an application such as a webbrowser, a word processor, a picture editing program, etc, application 227 can include executable instructions that request one or more threads to handle and process user input. In this example, application 227 may rely on mouse drivers, keyboard drivers, and other I/O drivers installed on the operating system and OS code to supply it with user interface messages.

Figure 4:
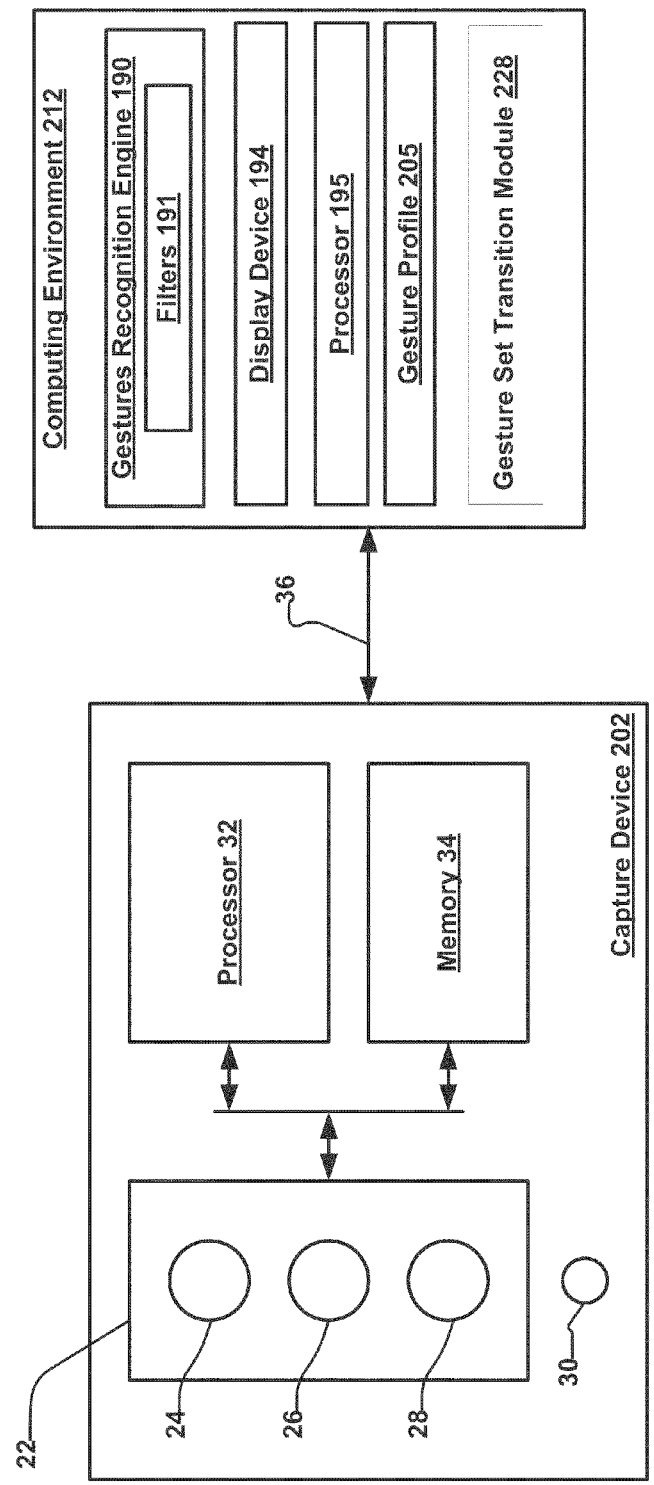
FIG. 4 illustrates an example embodiment of a capture device and computing environment that may be used in a target recognition, analysis, and tracking system.

In light of the diverse computing environments that may be built according to the general framework provided in FIG. 4 and the further diversification that can occur in computing in a network environment such as that of FIG. 4, the systems and methods provided herein cannot be construed as limited in any way to a particular computing architecture or operating system. Instead, the presently disclosed subject matter should not be limited to any single embodiment, but rather should be construed in breadth and scope in accordance with the appended claims. Thus, for example, although game consoles and server PCs have been discussed, just as easily full desktops could be remoted to smart phones as a means to access data and functionality that is otherwise unavailable to smart phones.

Finally, it should also be noted that the various techniques described herein may be implemented in connection with hardware or software or, where appropriate, with a combination of both. Thus, the methods, computer readable media, and systems of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present disclosure, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 3:
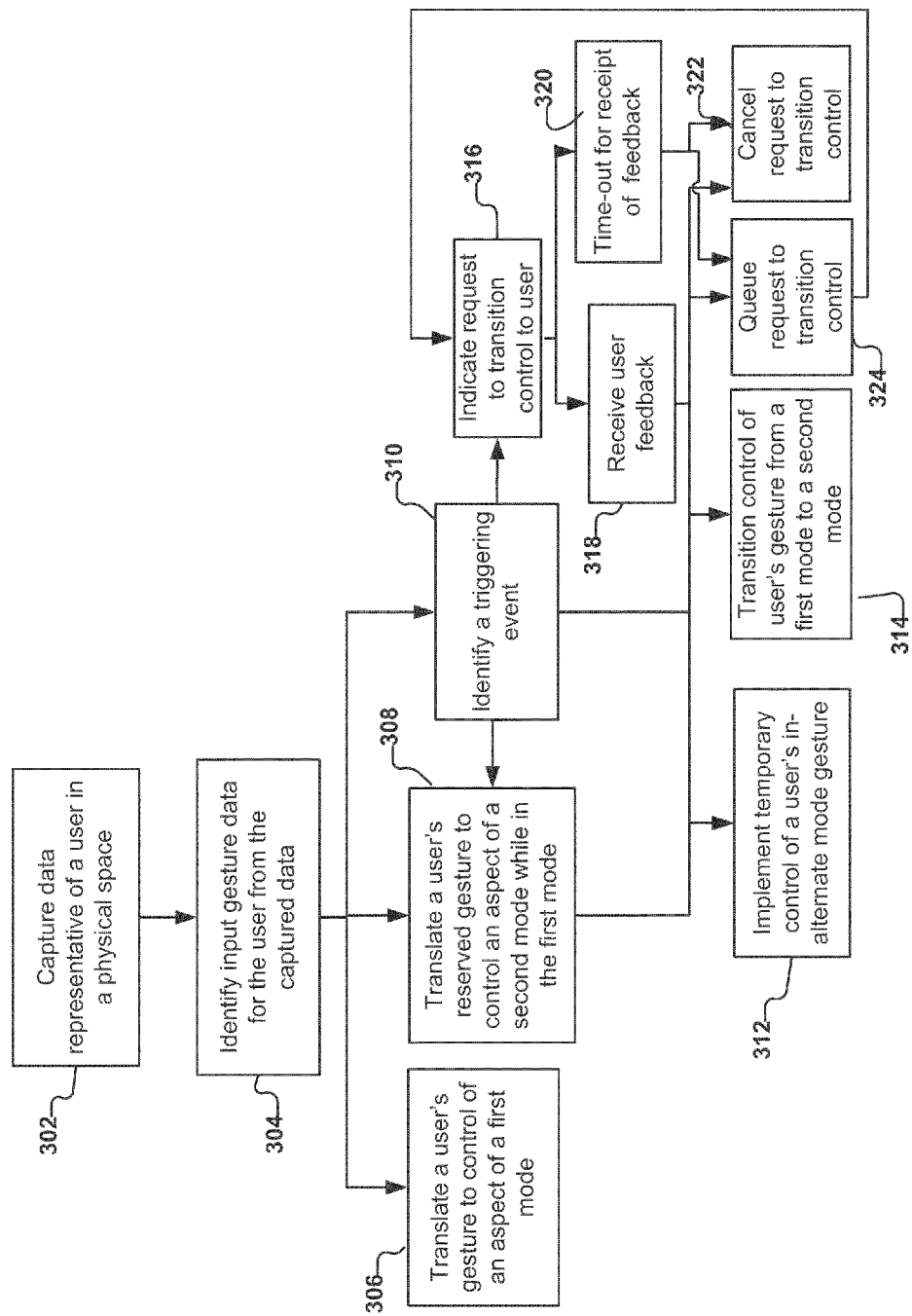
FIG. 3 depicts an example flow diagram for a method of implementing a gesture set applicable to a mode.

FIG. 3 depicts an example flow diagram of the method disclosed herein for transitioning control between modes of the gesture-based system. At 302, the system may capture data representative of a user in a physical space and, at 304, identify input gesture data for the user from the capture data. At 306, the system may translate the user's gesture to control an aspect of a first mode. For example, as described above, a mode may be a hardware or software configuration, such as a platform or application. The system may compare the input gesture data to gesture recognition data applicable to the first mode. The user's gesture may translate to a control of the mode, such as a control of an aspect of the platform or the application. For example, a user may gesture to jump in a game application or to power off a computing environment.

At 308, the system may translate a user's gesture to control an aspect of a second mode while the system is in a first mode. For example, as described above, a reserved set of gestures may be applicable system-wide regardless of the current mode. Thus, a user's gesture may control platform functionality even if the system is in an application mode. In-alternate mode gesture is a gesture that controls a second mode when the system is in a first mode.

The system may also transition control of a user's gestures from a first mode to a second mode. Thus, when performing gesture recognition, the system may utilize gesture recognition data for a second mode following the transition. A priority scheme may be defined that prioritizes modes such that the system may compare input gesture data to multiple modes in order of the modes in the priority scheme.

The transition of control of a user's gesture from a first mode to a second mode at 314 may occur as a result of a triggering event at 310. For example, a triggering event may comprise an external stimulus (e.g., an incoming phone call or electronic mail message), a recognition that a user's gesture registers with gesture recognition data in a second mode, a user's specific gesture requesting a transition to a different mode, a system's intelligent analysis of the environment to provide a user the option to transition modes, or the like. The transition from a first mode to a second mode may be temporary. Furthermore, the triggering event may not result in a transition of control, but an implementation of temporary control of a user's gestures applicable to a second mode, such that an in-alternate mode gesture scheme is implemented at 312. A reverting triggering event may revert to a previous mode. For example, if a user answers a call, the completion of the phone call may be a reverting triggering event, reverting the system to the previous mode. In another example, the triggering event could be a gesture by the user. For example, the user's "hang up" gesture may be a reverting gesture.

The triggering even may result in an indication to the user, requesting the transition to control at 316. For example, as described above, a symbol such as symbol 237 shown in FIG. 2A may be displayed to the user, or message 238. A selectable menu may be displayed showing a plurality of modes from which the user may choose. At 318, the system may receive feedback from the user, such as a selection of a symbol displayed on a screen or a gesture that indicates a mode to which to transition. If the user feedback indicates the user's desire to transition modes, the system may transition control of the user's gestures from a first mode to a second mode at 314, and the transition of control may be temporary, such as the implementation of reserved gestures at 312. Alternately, the user may indicate a desire to delay responding to the request to transition control or cancel the request. Thus, respectively, at 324, the system may queue the request to transition control or, at 322, the system may cancel the request to transition control. The system may queue the request at 324 or cancel the request at 322 if, at 320, if there is a time allotted at 320 for which the user is given to respond. For example, if the system displays a symbol 237 and the user does not respond within a certain period, such as five seconds, the system may queue the request or cancel the request and remove the symbol from the display. If the system queues the request, the system may indicate the request to transition control the user again at 316 after some delay or following an event, such as the completion of a phase in an application. Any time period may be set for such time-out for receipt of feedback at 320.

FIG. 4 illustrates an example embodiment of the capture device 202 that may be used for target recognition, analysis, and tracking, where the target can be a user or an object. According to an example embodiment, the capture device 202 may be configured to capture video with depth information including a depth image that may include depth values via any suitable technique including, for example, time-of-flight, structured light, stereo image, or the like. According to one embodiment, the capture device 202 may organize the calculated depth information into "Z layers," or layers that may be perpendicular to a Z axis extending from the depth camera along its line of sight.

As shown in FIG. 4, the capture device 202 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 4, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 202 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 202 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 202 to a particular location on the targets or objects.

According to another example embodiment, time-of-flight analysis may be used to indirectly determine a physical distance from the capture device 202 to a particular location on the targets or objects by analyzing the intensity of the reflected beam of light over time via various techniques including, for example, shuttered light pulse imaging.

In another example embodiment, the capture device 202 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 202 to a particular location on the targets or objects.

According to another embodiment, the capture device 202 may include two or more physically separated cameras that may view a scene from different angles, to obtain visual stereo data that may be resolved to generate depth information. In another example embodiment, the capture device 202 may use point cloud data and target digitization techniques to detect features of the user.

The capture device 202 may further include a microphone 30, or an array of microphones. The microphone 30 may include a transducer or sensor that may receive and convert sound into an electrical signal. According to one embodiment, the microphone 30 may be used to reduce feedback between the capture device 202 and the computing environment 218 in the target recognition, analysis, and tracking system 10. Additionally, the microphone 30 may be used to receive audio signals that may also be provided by the user to control applications such as game applications, non-game applications, or the like that may be executed by the computing environment 218.

In an example embodiment, the capture device 202 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction. For example, the computer-readable medium may comprise computer executable instructions for receiving data of a scene, wherein the data includes data representative of the target in a physical space. The instructions comprise instructions for gesture profile personalization and gesture profile roaming, as described herein.

The capture device 202 may further include a memory component 34 that may store the instructions that may be executed by the processor 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 4, in one embodiment, the memory component 34 may be a separate component in communication with the image capture component 22 and the processor 32. According to another embodiment, the memory component 34 may be integrated into the processor 32 and/or the image capture component 22.

As shown in FIG. 4, the capture device 202 may be in communication with the computing environment 218 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 218 may provide a clock to the capture device 202 that may be used to determine when to capture, for example, a scene via the communication link 36.

Additionally, the capture device 202 may provide the depth information and images captured by, for example, the 3-D camera 26 and/or the RGB camera 28, and a skeletal model that may be generated by the capture device 202 to the computing environment 218 via the communication link 36. The computing environment 218 may then use the skeletal model, depth information, and captured images to, for example, control an application such as a game or word processor. For example, as shown, in FIG. 4, the computing environment 212 may include a gestures library 192.

As shown, in FIG. 4, the computing environment 212 may include a gestures library 192 and a gestures recognition engine 190. The gestures recognition engine 190 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

While it is contemplated that the gestures recognition engine 190 may include a collection of gesture filters, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

In an example embodiment, a gesture may be recognized as a trigger for the entry into a modification mode, where a user can modify gesture parameters in the user's gesture profile. For example, a gesture filter 191 may comprise information for recognizing a modification trigger gesture. If the modification trigger gesture is recognized, the application may go into a modification mode. The modification trigger gesture may vary between applications, between systems, between users, or the like. For example, the same gesture in a tennis gaming application may not be the same modification trigger gesture in a bowling game application.

The data captured by the cameras 26, 28 and device 202 in the form of the skeletal model and movements associated with it may be compared to the gesture filters 191 in the gestures library 192 to identify when a user (as represented by the skeletal model) has performed one or more gestures.

Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 212 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 202 itself, and the raw image data of depth and color (where the capture device 202 comprises a 3D camera 26) values are transmitted to the computing environment 212 via link 36. In another embodiment, the processing is performed by a processor 32 coupled to the camera 402 and then the parsed image data is sent to the computing environment 212. In still another embodiment, both the raw image data and the parsed image data are sent to the computing environment 212. The computing environment 212 may receive the parsed image data but it may still receive the raw data for executing the current process or application. For instance, if an image of the scene is transmitted across a computer network to another user, the computing environment 212 may transmit the raw data for processing by another computing environment.

The computing environment 212 may use the gestures library 192 along with a gesture profile 205 such as that shown in FIG. 4 to interpret movements of the skeletal model and to control an application based on the movements. The computing environment 212 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIG. 1. The avatar's motion can be controlled directly by mapping the avatar's movement to those of the user's movements. The user's gestures may be interpreted control certain aspects of the application.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store a gesture profile 205 associated with the user in a computing environment such as computing environment 212. The gesture profile 205 may be specific to a user, application, or a system. The gesture profile 205 may be accessible via an application or be available system-wide, for example. The gesture profile 205 may include lookup tables for loading specific user profile information. The virtual screen may interact with an application that may be executed by the computing environment 212 described above with respect to FIG. 1.

The gesture profile 205 may include user identification data such as, among other things, the target's scanned or estimated body size, skeletal models, body models, voice samples or passwords, the target's gender, the targets age, previous gestures, target limitations and standard usage by the target of the system, such as, for example a tendency to sit, left or right handedness, or a tendency to stand very near the capture device. This information may be used to determine if there is a match between a target in a capture scene and one or more users. If there is a match, the gesture profiles 205 for the user may be loaded and, in one embodiment, may allow the system to adapt the gesture recognition techniques to the user, or to adapt other elements of the computing or gaming experience according to the gesture profile 205.

One or more gesture profiles 205 may be stored in computer environment 212 and used in a number of user sessions, or one or more profiles may be created for a single session only. Users may have the option of establishing a profile where they may provide information to the system such as a voice or body scan, age, personal preferences, right or left handedness, an avatar, a name or the like. Gesture profiles may also be generated or provided for "guests" who do not provide any information to the system beyond stepping into the capture space. A temporary personal profile may be established for one or more guests. At the end of a guest session, the guest gesture profile may be stored or deleted.

The gestures library 192, gestures recognition engine 190, and gesture profile 205 may be implemented in hardware, software or a combination of both. For example, the gestures library 192, and gestures recognition engine 190 may be implemented as software that executes on a processor, such as processor 195 of the computing environment 212 shown in FIG. 4, or on processing unit 101 of FIG. 6, or processing unit 259 of FIG. 7.

It is emphasized that the block diagrams depicted in FIG. 4 and FIGS. 6 and 7 described below are exemplary and not intended to imply a specific implementation. Thus, the processors 195 or 32 in FIG. 4, the processing unit 101 of FIG. 6, and the processing unit 259 of FIG. 7, can be implemented as a single processor or multiple processors. Multiple processors can be distributed or centrally located. For example, the gestures library 192 may be implemented as software that executes on the processor 32 of the capture device or it may be implemented as software that executes on the processor 195 in the computing environment 212. Any combinations of processors that are suitable for performing the techniques disclosed herein are contemplated. Multiple processors can communicate wirelessly, via hard wire, or a combination thereof The gestures library and filter parameters may be tuned for an application or a context of an application by a gesture tool. A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-user shooter game that involves operating a motor vehicle. While the user is on foot, making a first with the fingers towards the ground and extending the first in front and away from the body may represent a punching gesture. While the user is in the driving context, that same motion may represent a "gear shifting" gesture.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter 191 to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

Figure 5A:
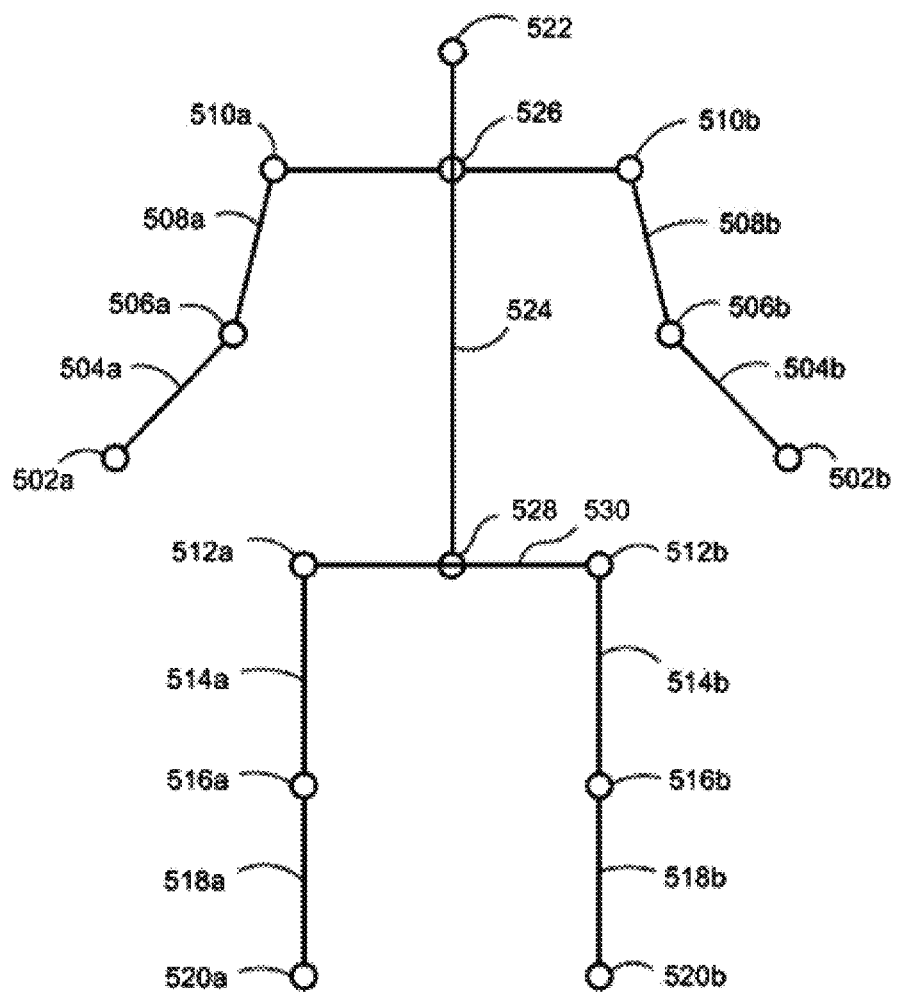
FIG. 5A illustrates a skeletal mapping of a user that has been generated from a target recognition, analysis, and tracking system such as that shown in FIG. 4.

FIG. 5A depicts an example skeletal mapping of a user that may be generated from the capture device 202. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may be a single movement (e.g., a jump) or a continuous gesture (e.g., driving), and may be short in duration or long in duration (e.g., driving for 202 minutes). A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 202. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and breaking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned gesture animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture are important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510*a*, and on the same side of the head 522 as the throwing arm 502*a*-310*a*. It may not be necessary to define all bounds of a volume, such as with this throwing gesture, where an outer bound away from the body is left undefined, and the volume extends out indefinitely, or to the edge of scene that is being monitored.

Figure 5B:
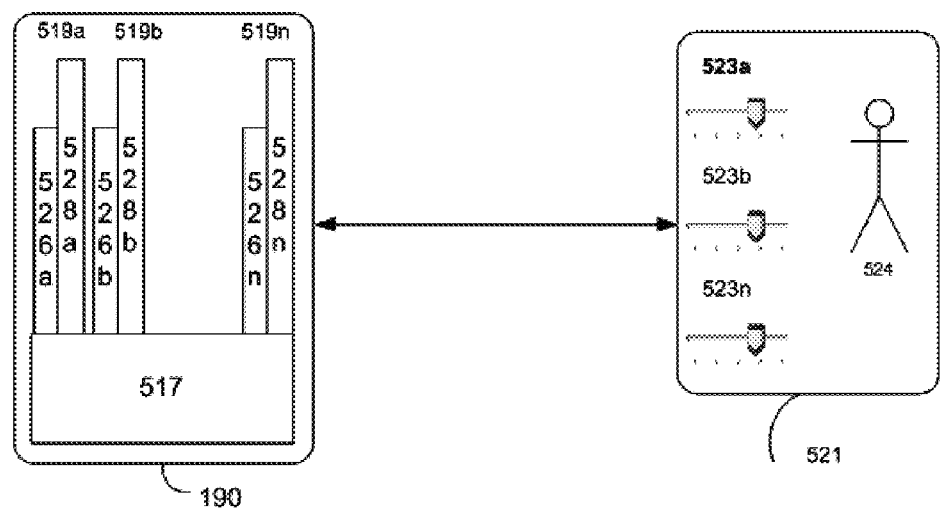
FIG. 5B illustrates further details of a gesture recognizer architecture such as that shown in FIG. 4.

FIG. 5B provides further details of one exemplary embodiment of the gesture recognizer engine 190 of FIG. 4. As shown, the gesture recognizer engine 190 may comprise at least one filter 519 to determine a gesture or gestures. A filter 519 comprises information defining a gesture 526 (hereinafter referred to as a "gesture"), and may comprise at least one parameter 528, or metadata, for that gesture 526. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the recognizer engine 190 that the gesture 526 occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine 190 architecture. For instance, there may be a first filter for driving that takes as input skeletal data and outputs a confidence that the gesture 526 associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter 528. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gesture recognizer engine 190 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

The base recognizer engine 517 may include a gesture profile 520. For example, the base recognizer engine 517 may load a gesture profile 520 into the gesture recognition engine temporarily for a user, store the gesture profile 520 with the gesture filter information, or otherwise access the gesture profile 520 from a remote location. The gesture profile 520 may provide parameters that adapt the information in the filters 519 to correspond to a specific user. For example, as described above, a gesture 526 may be a throw having a parameter 528 for a threshold velocity or a distance the hand must travel. The gesture profile 520 may redefine the threshold velocity or a distance the hand must travel for the throwing gesture 526. The base recognizer engine 517, therefore, may supplement or replace parameters in the filter 519 with parameters from the gesture profile 520. The filters 519 may be default gesture information and the gesture profile 520 may be loaded specifically for a particular user.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 190, or it may provide its own filter 519, which plugs in to the base recognizer engine 517. Similarly, the gesture profile may plug in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, identified as such. This visualization of the parameters 528 of gestures provides an effective means to both debug and fine tune a gesture.

Figure 6:
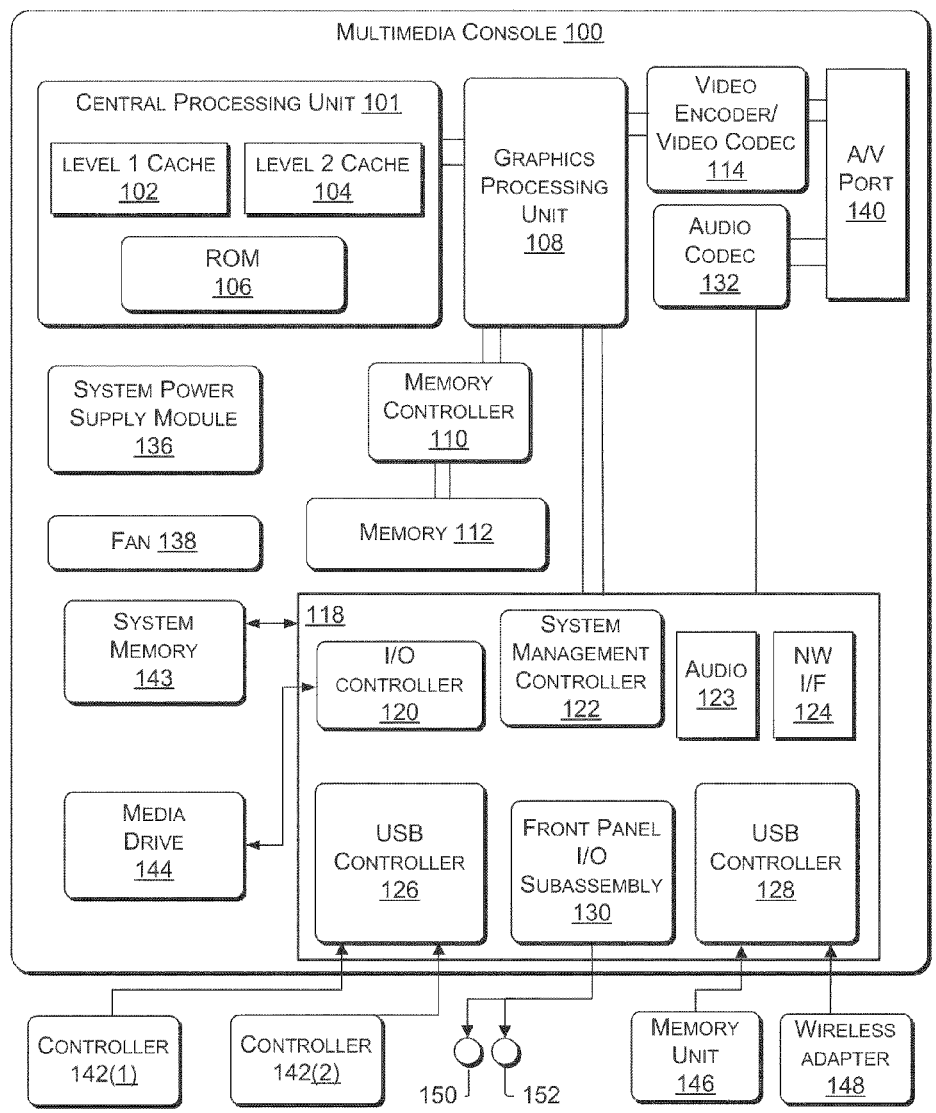
FIG. 6 illustrates an example embodiment of a computing environment in which the techniques described herein may be embodied.

FIG. 6 depicts an example flow diagram for a method establishing a shared presentation experience for a plurality of users. For example, a system 200, 300 such as that shown in FIGS. 1-3 may perform the operations shown here.

At 602, the system may render a presentation of information. As described above, a presentation of information may include any productivity scenario in which information is being presented, where the presentation may take a variety of formats. At 604, the system may capture data from a physical space that includes a target, such as a user or a non-human object. As described above, a capture device can capture data of a scene, such as the depth image of the scene and scan targets in the scene. The capture device may determine whether one or more targets in the scene correspond to a human target such as a user. For example, to determine whether a target or object in the scene corresponds to a human target, each of the targets may be flood filled and compared to a pattern of a human body model. Each target or object that matches the human body model may then be scanned to generate a skeletal model associated therewith. For example, a target identified as a human may be scanned to generate a skeletal model associated therewith. The skeletal model may then be provided to the computing environment for tracking the skeletal model and rendering a visual representation associated with the skeletal model.

Any known technique or technique disclosed herein that provides the ability to scan a known/unknown object, scan a human, and scan background aspects in a scene (e.g., floors, walls) may be used to detect features of a target in the physical space. The scan data for each, which may include a combination of depth and RGB data, may be used to create a three-dimensional model of the object. The RGB data is applied to the corresponding area of the model. Temporal tracking, from frame to frame, can increase confidence and adapt the object data in real-time. Thus, the object properties and tracking of changes in the object properties over time may be used to reliably track objects that change in position and orientation from frame to frame in real time. The capture device captures data at interactive rates, increasing the fidelity of the data and allowing the disclosed techniques to process the raw depth data, digitize the objects in the scene, extract the surface and texture of the object, and perform any of these techniques in real-time such that the display can provide a real-time depiction of the scene. Further, multiple capture devices may capture data of a physical space. The data may be merged such that the fidelity of gesture recognition increases where recognition is based on additional data. A capture device may be focused on a single user or may capture data with respect to many users. If there are multiple capture devices that can share data, then if a first capture device does not have a view or does not have a good view of a user, a second capture device in the physical space may capture data of the user.

The system may identify each of the users in the physical space at 606 and associate each user with a visual representation at 614. The system may designate a level of control for each user at 608, wherein the control is accomplished via gestures in the physical space. For example, a user may be a primary user, a secondary user, or an observing user. Depending on the gesture and the user that performs the gesture, gestures may control aspects of the presentation of information. The system may determine if a user performs a gesture at 610 and use the gesture to control a program at 612. For example, a gesture may comprise a user's position or motion that may be captured as image data and parsed for meaning. The parsed image data can be filtered by a gesture recognition engine, for example, to determine if a gesture was performed at 610. Thus, via the gesture-based system, a presentation of information may be controllable by a plurality of users. Control may be shared, transferred, or the like for the various participants to the presentation.

A visual representation may be associated with each user at 614 and the system may animate the visual representation at 616 to correspond to the gesture or to a control that results from the gesture. The visual representation may be associated with more than one user, or each user may have a unique visual representation. For example, if multiple users are associated with the same visual representation, the system may transfer control between users.

At 618, if the presentation of information is non-sequential, as described above, the gesture may control an aspect of the non-sequential information. Thus, a gesture may apply to the user's selection of the desired portion of the non-sequential information. A display of the selected portion may provide a conversion of a canvas of non-sequential information to a focused portion of such canvas. The user can navigate through the canvas to change the focused portion of the assets available in the presentation.

The computer executable instructions may comprise instructions for establishing a shared presentation experience and transferring control between users, as described herein. Any of the methods for the shared presentation experience via gestures described herein may be implemented as computer executable instructions.

FIG. 6 illustrates an example embodiment of a computing environment that may be used to interpret one or more gestures in a target recognition, analysis, and tracking system. The computing environment such as the computing environment 212 described above with respect to FIG. 1 may be a multimedia console 100, such as a gaming console. As shown in FIG. 6, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 2120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 2124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 202 may define additional input devices for the console 100.

Figure 7:
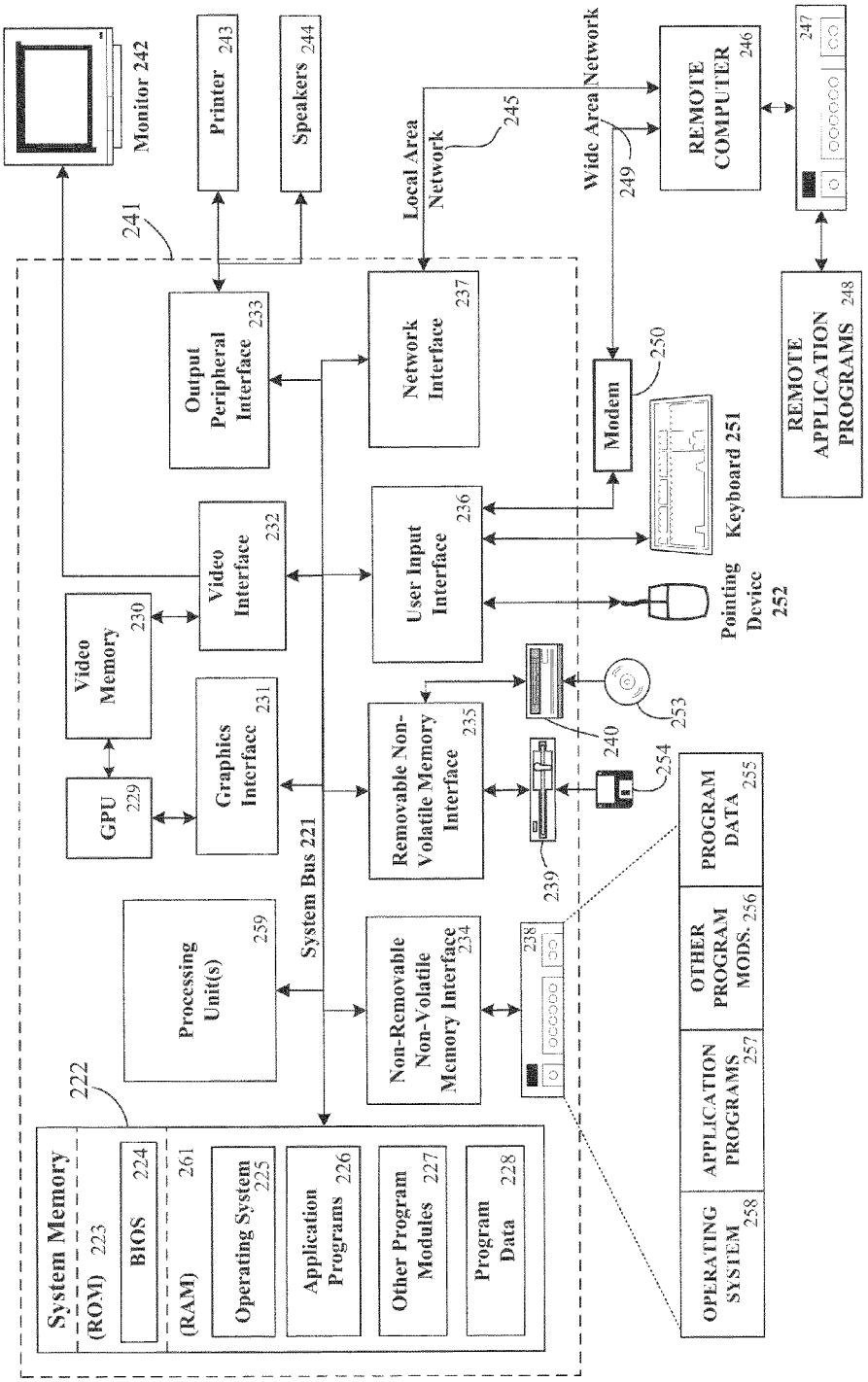
FIG. 7 illustrates another example embodiment of a computing environment in which the techniques described herein may be embodied.

FIG. 7 illustrates another example embodiment of a computing environment 220 that may be the computing environment 212 shown in FIG. 1 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 7, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 261. A basic input/output system 224 (BIOS), containing the basic routines that help to transfer information between elements within computer 241, such as during start-up, is typically stored in ROM 223. RAM 261 typically contains data and/or program modules that are immediately accessible to and/or presently being operated on by processing unit 259. By way of example, and not limitation, FIG. 7 illustrates operating system 225, application programs 226, other program modules 227, and program data 228.

The computer 241 may also include other removable/non-removable, volatile/nonvolatile computer storage media. By way of example only, FIG. 7 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 7, provide storage of computer readable instructions, data structures, program modules and other data for the computer 241. In FIG. 7, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 202 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 7. The logical connections depicted in FIG. 7 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 7 illustrates remote application programs 248 as residing on memory device 247. It will be appreciated that the network connections shown are exemplary and other means of establishing a communications link between the computers may be used.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method for enabling modes in a gesture-based system, comprising:
    receiving image data representative of at least part of a user body motion or pose in a physical space;
    based at least on receiving the image data representative of the at least part of the user body motion or pose while the gesture-based system is in a first mode, transitioning control of the gesture-based system from the first mode to a second mode, the first mode having an associated first set of input command gestures and the second mode having an associated second set of input command gestures;
    based at least on receiving second image data representative of at least part of a user body motion or pose while the gesture-based system is in the second mode, transitioning control of the gesture-based system from the second mode to the first mode; and
    based at least on receiving third image data representative of at least part of a user body motion or pose while the gesture-based system is in the first mode, the third image data representative of a user body motion or pose being recognized as invoking an input command gesture in the second set of input command gestures associated with the second mode, but not being recognized as invoking an input command gesture in the first set of input command gestures associated with the first mode, processing the third image data representative of the at least part of the user body motion or pose by invoking, while in the first mode, the input command gesture in the second set of input command gestures associated with the second mode.

2. The method of claim 1, further comprising:
    controlling the gesture-based system in the first mode based at least on transitioning control of the gesture-based system to the first mode.

3. The method of claim 1, further comprising:
    identifying a triggering event prompting transitioning control of the gesture-based system from the first mode to the second mode.

4. The method of claim 1, wherein the third image data comprises an in-alternate mode gesture that is used to control the gesture-based system in the first mode.

5. The method of claim 1, wherein the third image data comprises a reserved gesture that is applicable system-wide.

6. The method of claim 1, further comprising:
    setting variable preferences to define a manner in which a control of the gesture-based system is implemented.

7. The method of claim 6, further comprising:
    designating a functionality of the second mode that is available to control the gesture-based system in the first mode.

8. The method of claim 1, further comprising:
    subsequently controlling the gesture-based system based at least on identifying a gesture from the first image data.

9. The method of claim 1, wherein a mode comprises:
    an application mode, a platform mode, or a device mode.

10. The method of claim 1, further comprising:
    recording a complex gesture as a macro.

11. The method of claim 1, further comprising:
    directing the control of the gesture-based system to a particular device.

12. The method of claim 1, wherein the first image data and the second image data identify the same user motion or pose.

13. A system for controlling aspects of a gesture-based system in modes, comprising:
    a memory bearing instructions that, upon execution by a processor, cause the system at least to:
        receive image data representative of at least part of a user body motion or pose in a physical space;
        process the received image data to identify input gesture data for the user;
        determine that the input gesture data is associated with a first mode or a second mode, the first mode having an associated first set of input command gestures and the second mode having an associated second set of input command gestures;
        transition from the first mode to the second mode when the input gesture data is associated with the second mode; and
        based at least on determining that the input gesture data is associated with a gesture in the second set of input command gestures associated with the second mode but not in the first set of input command gestures associated with the first mode, process the input gesture data by invoking, while in the first mode, an input command gesture in the second set of input command gestures associated with the second mode.

14. The system of claim 13, wherein the memory further bears instructions that, upon execution by the processor, cause the system at least to:
    transition from the second mode to the first mode when the input gesture data is associated with the first mode.

15. The system of claim 14, wherein the second mode is associated with control of a second computing environment and the first mode is associated with control of a first computing environment, wherein transitioning from the second mode to the first mode comprises transitioning control from the second computing environment to the first computing environment.

16. The system of claim 14, wherein instructions that, when executed on the processor cause the system at least to transition from the first mode to the second mode further cause the system at least to:
   transition from a first application executing in the first mode to a second application executing in the second mode.

17. The system of claim 13, wherein a plurality of devices are adapted for the control of the gesture-based system associated with the input gesture data, the plurality of devices adapted to coordinate such that at least one of the plurality of devices performs the control.

18. A computer-readable storage device that is not a propagating signal for transitioning between modes in a gesture-based system, the computer-readable storage device bearing computer-executable instructions that, when executed, cause the system to perform operations comprising:
   receiving image data representative of at least part of a user body motion or pose in a physical space;
   processing the received image data to identify input gesture data for the user;
   providing the gesture-based system in a first mode, based at least on the input gesture data being associated with the first mode, the first mode having an associated first set of input command gestures;
   providing the gesture-based system in a second mode, based at least on the input gesture data being associated with the mode, the second mode having an associated second set of input command gestures; and
   based at least on receiving the input gesture data while the gesture-based system is in the first mode, the input gesture data being recognized in the second set of input command gestures associated with the second mode but not recognized in the first set of input command gestures associated with the first mode, processing, while in the first mode, the input gesture data by invoking the input gesture data recognized in the second set of input command gestures associated with the second mode.

19. The computer-readable storage device of claim 18, wherein the first mode and the second mode are both active modes.

20. The computer-readable storage device of claim 18, wherein control of the gesture-based system in the first mode is available via at least one gesture when the gesture-based system is in the second mode.

* * * * *